US005093675A

United States Patent [19]

Koumura et al.

[11] Patent Number: 5,093,675

[45] Date of Patent: Mar. 3, 1992

[54] HAND-HELD RECORDING APPARATUS

[75] Inventors: Noboru Koumura, Narashino; Toshiaki Harada, Kawasaki; Ryozo Yanagisawa, Matsudo; Hiroshi Tanioka, Yokohama, all of Japan

[73] Assignee: Canon Kabushiki Kaisha, Tokyo, Japan

[21] Appl. No.: 576,168

[22] Filed: Aug. 31, 1990

Related U.S. Application Data

[63] Continuation of Ser. No. 182,714, Apr. 18, 1988, abandoned.

[30] Foreign Application Priority Data

| | | | |
|---|---|---|---|
| Apr. 20, 1987 | [JP] | Japan | 62-095060 |
| Jun. 22, 1987 | [JP] | Japan | 62-153563 |
| Jul. 9, 1987 | [JP] | Japan | 62-169706 |

[51] Int. Cl.[5] .................... G01D 15/10; B41J 35/02

[52] U.S. Cl. .................... 346/143; 346/76 PH; 400/88; 400/193

[58] Field of Search .............. 346/76 PH, 143; 400/88, 400/193

[56] References Cited

U.S. PATENT DOCUMENTS

| | | | |
|---|---|---|---|
| 4,297,039 | 10/1981 | Lees | 400/120 |
| 4,915,027 | 4/1990 | Ishibashi et al. | 346/76 PH X |

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

A hand-held recording apparatus for image recording on a recording medium by manual movement comprises a main body, a thermal head provided in the main body and having plural heat-generating elements for image recording on the recording medium, an ink sheet positioned feedable to a recording position by the thermal head and bearing ink which is transferred onto the recording medium in response to the heat generation of the thermal head, a first elastic member for biasing the thermal head to the recording medium, and a second elastic member for biasing the main body having the thermal head therein to the recording medium.

The elastic force of the second elastic member is selected larger than that of the first elastic member.

18 Claims, 8 Drawing Sheets

FIG. 2
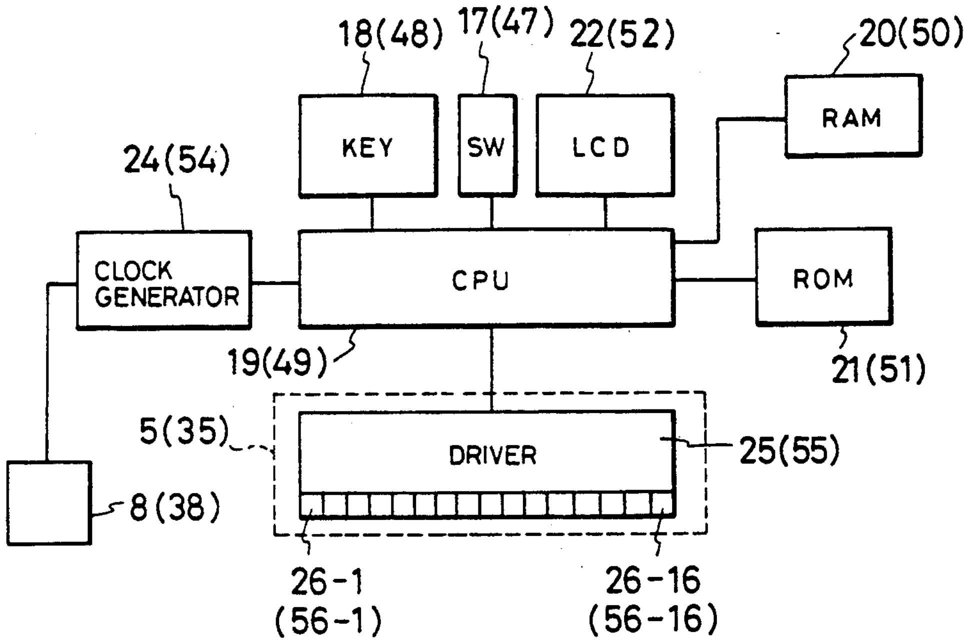
FIG. 3
| | #0 | #1 | #2 | #3 | #4 |
|---|---|---|---|---|---|
| D0 | 0 | 1 | 1 | 1 | 1 |
| D1 | 0 | 1 | 0 | 0 | 0 |
| D2 | 0 | 1 | 1 | 1 | 0 |
| D3 | 0 | 1 | 0 | 0 | 0 |
| D4 | 0 | 1 | 0 | 0 | 0 |
| D5 | 0 | 1 | 0 | 0 | 0 |
FIG. 4
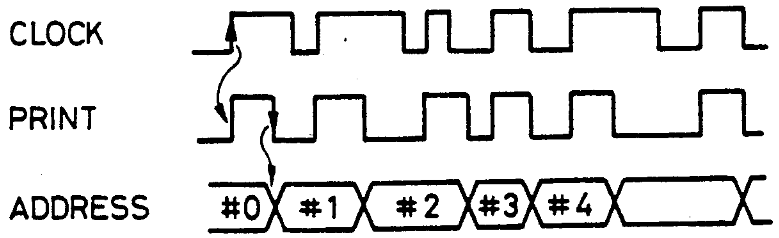

HAND-HELD RECORDING APPARATUS

This application is a continuation of application Ser. No. 07/182,714 filed Apr. 18, 1988 now abandoned.

BACKGROUND OF THE INVENTION

1. Field of the Invention

The present invention relates to a hand-held recording apparatus for image recording on a recording medium by a manual operation.

The hand-held recording apparatus means a recording apparatus manually driven by the operator for image recording on a recording medium such as ordinary paper, fabric or plastic sheet, and includes an apparatus connected to a main unit such as a word processor or a typewriter and recording an image according to the image information supplied from said main unit, and an apparatus having therein a mechanism for input of the image information. Said image includes characters, numerals, patterns and graphics.

2. Related Background Art

The present applicant already disclosed, in the Japanese Patent Application No. 251953/1986, a hand-held recording apparatus for partial add-on recording for correction or addition of documents, for recording on a small sized sheet or for recording on a bound notebook, in place of conventional word processors.

The present invention is to provide a novel technology constituting an improvement over a part of the above-explained recording apparatus.

SUMMARY OF THE INVENTION

An object of the present invention is to provide a hand-held recording apparatus capable of recording a clear image on a recording medium.

Another object of the present invention is to provide a hand-held recording apparatus which can record an image while being manually displaced by the operator.

Still another object of the present invention is to provide a hand-held recording apparatus capable of stably pressing a recording head to the recording medium while the apparatus is manually displaced.

Still another object of the present invention is to provide a hand-held recording apparatus which can be stably pressed to the recording medium while it is manually displaced.

Still another object of the present invention is to provide a hand-held recording apparatus which is not affected by the change in the scanning speed.

BRIEF DESCRIPTION OF THE DRAWINGS

FIG. 2 is a block diagram of a control unit;

FIG. 3 is a chart showing ROM addresses and data therein for character recording;

FIG. 4 is a timing chart showing the driving of a recording head;

DETAILED DESCRIPTION OF THE PREFERRED EMBODIMENTS

Figure 1A:
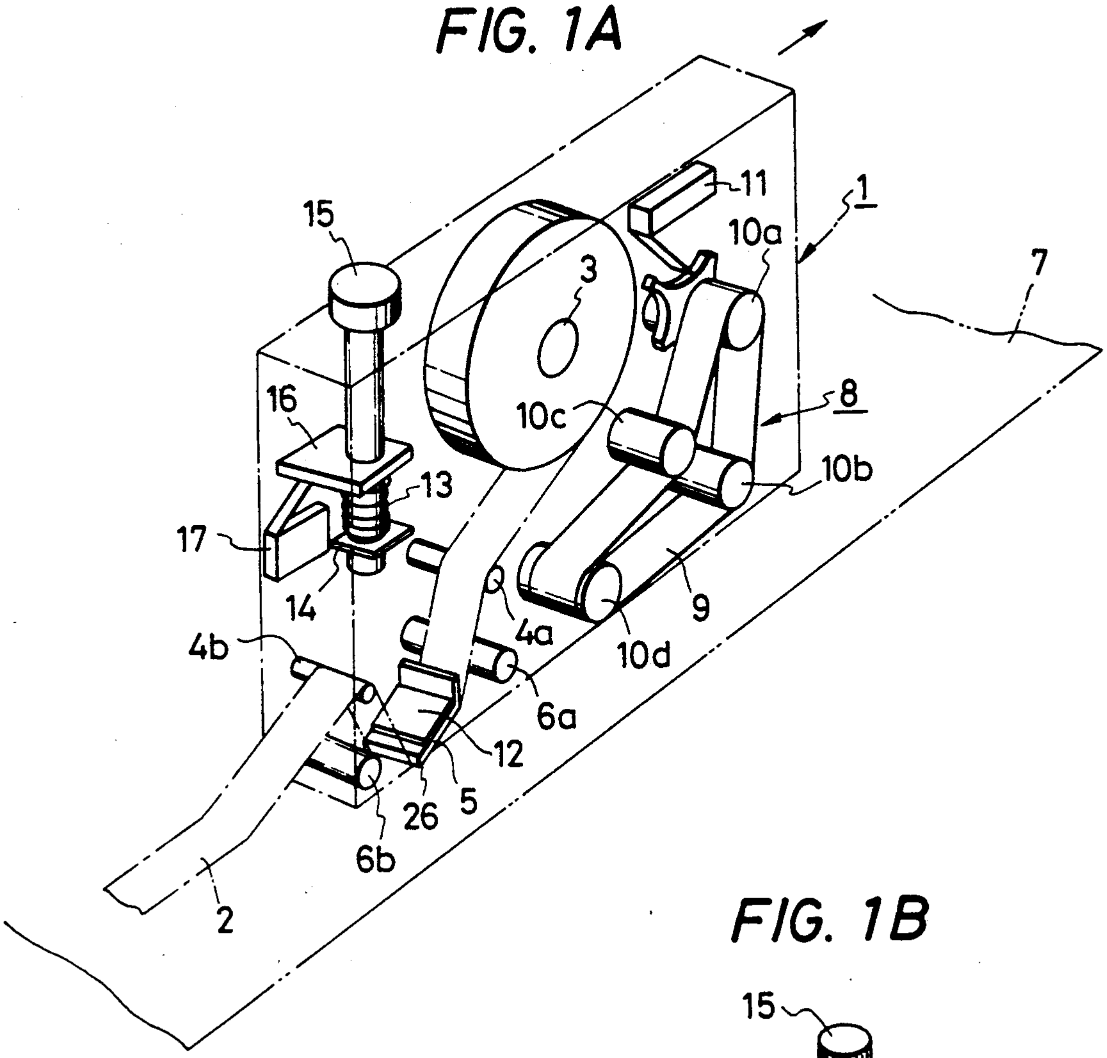
FIGS. 1A and 1B are magnified perspective views of principal parts of an apparatus embodying the present invention.
Figure 1B:
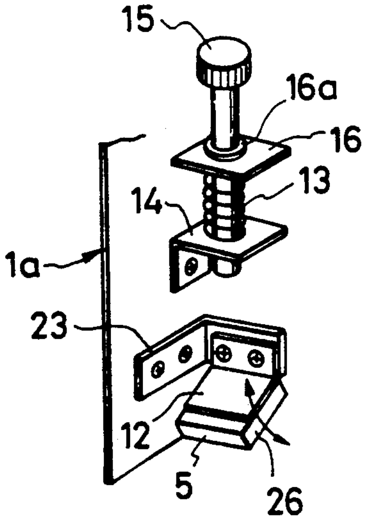
Figure 5:
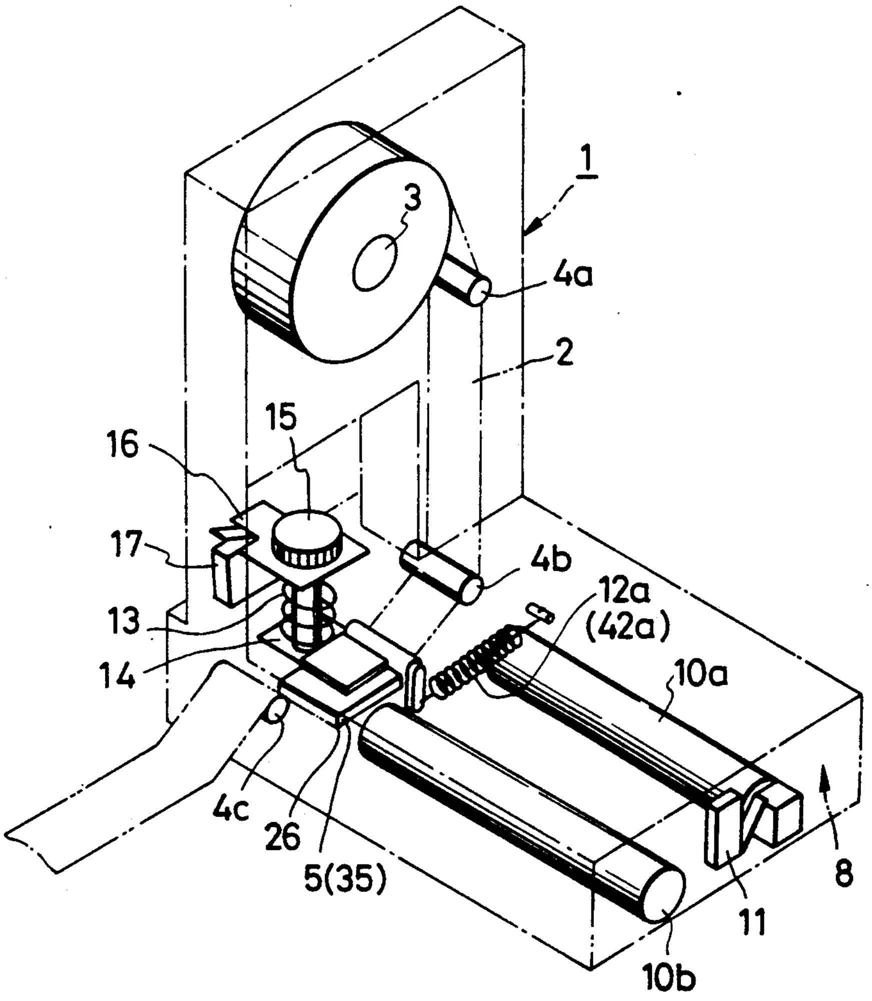
FIG. 5 is a magnified perspective view of a principal part of another embodiment.

Now the present invention will be explained by an embodiment thereof. FIGS. 1A and 1B are magnified perspective views of a principal part of an apparatus embodying the present invention; FIG. 2 is a block diagram thereof; FIG. 3 is a chart showing ROM addresses and data therein for character recording; FIG. 4 is a timing chart showing the driving of a recording head; and FIG. 5 is a magnified perspective view of a principal part of another embodiment.

In FIG. 1A, a main apparatus 1 contains a thermal transfer ink ribbon 2 bearing ink and wound on a ribbon reel 3. The ribbon 2 unwound from said reel 3 is guided through a guide roller *4a*, a thermal recording head 5 and a guide roller *4b*, and is extracted from the main body 1. On both sides of said recording head 5 there are provided rollers *6a*, *6b* which are rotated by friction with a recording medium, when the main body 1 is moved on the recording medium such as a notebook, thereby enabling stable movement of the main body.

An encoder 8 is composed of a flat belt 9 running over rollers *10a*, *10b*, *10c* and *10d*, which are rotated when said flat belt 9 is moved in contact with the recording medium 7. A microswitch 11 is turned on and off by the rotation of the roller *10a*. Thus, when the main body 1 is moved in a direction indicated by an arrow, in contact with and along the recording medium 7, the flat belt 9 rotates the roller *10a* thereby turning on and off the microswitch 11 at intervals. A plate spring 12 (first biasing means) for biasing the recording head 5 to the recording medium 7 is fixed to a frame *1a* through a jig 23 shown in FIG. 1B. Said recording head 5 is provided with heat-generating resistors 26 divided into 16 pixels in the transversal direction of the ink ribbon 2 and corresponding driving circuits therefor, and is maintained in contact with the aforementioned thermal transfer ink ribbon 2.

A compression spring 13 (second biasing means), for biasing the main body 1 to the recording medium, is supported, as shown in FIG. 1B, between a spring receiving plate 14 fixed to the frame *1a* of the main body 1 and a movable plate 16 fixed to a switch rod 15. Thus depression of the switch rod 15 compresses the spring 13, which reaction biases downwards the receiving plate 14 and the main body 1 fixed thereto. *16a* indicates a stop ring. A microswitch 17 positioned close to said movable plate 16 is turned on by said movable plate 16 when said switch rod 15 is depressed, and is turned off when the movable plate 16 is elevated by said compression spring 13.

FIG. 2 is a block diagram of the control system of the present embodiment. The information to be recorded is entered in advance by keys 18, fetched by a CPU 19 and stored in a RAM 20. Said information storage is conducted in the following manner. When alphanumeric keys 18 are selectively depressed, corresponding internal codes are fetched by the CPU 19 and temporarily stored in the RAM 20. A character is generated when a character code is given to a ROM 21 functioning as a character generator, and is displayed by a dot matrix on a liquid crystal display (LCD) 22. The operator can confirm, from said display, that the depressed key has been exactly stored in the RAM 20. The desired information to be recorded can be displayed and stored in succession by repeating similar procedure. Input data exceeding the display area of the liquid crystal display 22 can be displayed by data scrolling.

In the following there will be explained the recording procedure after the information input. The switch 17 connected to the CPU 19 functions as a contact switch for detecting that the recording head 5 is maintained in contact with the recording medium 7, and as a recording state detecting switch for detecting that the main body is in recording state while sliding on the recording medium 7. The recording head 5 can be energized only when the switch 17 is turned on. By depressing the switch rod 15 to turn on the switch 17 while the ink ribbon 2 is maintained in contact with the recording medium 7 and by moving the main body 1, the encoder 8 sends clock pulses to a clock generator 24, according to the amount of movement of the main body 1, or the amount of feeding of the ink ribbon 2. Said clock generator 24, being triggered by the clock signal from the encoder 8, generates a pulse of a duration of about 2 ms. In response to said pulse the information already stored in the RAM 20 is read, and the CPU 19 causes the ROM 21 to generate image data corresponding to said information and energizes a driver 25 in the recording head 5. 26-1–26-16 show heat-generating resistors of 16 pixels maintained in contact with the thermal transfer ink ribbon 2. Said heat-generating resistors 26-1–26-16 are controlled by the information read from the ROM 21 according to the amount of movement of the main body 1, and said information is heat-transfer recorded on the recording medium 7.

FIG. 3 shows the addresses and data of the ROM 21 for recording a character "F", indicating the data in the vertical direction (D0–D6) as a function of the ROM addresses in the horizontal direction (# 4).

In the following there will be explained the actual recording sequence, with reference to FIGS. 3 and 4.

In recording the character "F", the CPU 19 addresses the ROM 21 in response to each print clock signal, and seven of sixteen heat-generating resistors 26-1–26-16 of the recording head 5 are energized by the data thus read from the ROM 21. In the present embodiment the resistors are activated corresponding to the data "1", and the recording of character "F"is completed by six print clock signals.

In the present embodiment it is assumed that the encoder generates a clock pulse at an interval of ¼ mm, but the present invention is naturally not limited to such embodiment. Also the position of the recording head is not limited to that of the present embodiment as long as the scope of the present invention is satisfied.

Also the number of heat-generating resistors is not limited to 16.

FIG. 4 is a timing chart showing the driving method of the recording head 5.

In general, from the standpoint of human engineering, 50 mm/sec is considered as a most appropriate speed at which a person can move an object with a controlled constant speed. Consequently the frequency of the output of the encoder is preferably selected equal to ca. 200 Hz (5 ms per interval). However, in the present embodiment, in order to cope with the unevenness in speed in practice, the sixteen heat-generating resistors 26-1–26-16 are activated in parallel manner according to the information to be recorded, for a predetermined period (ca. 2 ms) from the start edge of the output signal of the encoder.

In FIG. 4, the clock signal is generated by the encoder 8 in response to the movement of each ¼ mm of the main body 1, and the print clock signal is generated by the clock generator 24 for a duration of ca. 2 ms from the start edge of said clock signal. Also there is shown the successive selection of the addresses of the ROM 21, corresponding to each leading edge of said print clock signal. The CPU 19 counts the print clock signals and addresses the ROM 21 to read image data according to the information stored therein. The recording data read from the ROM 21 are used for activating the heat-generating resistors during the high-state (2 ms) of the print clock signal, thereby transferring ink from the ink ribbon 2 onto the recording medium 7. The unevenness caused by manual movement can be eliminated by generating, as explained above, the print clock signal at the leading edge of each clock signal generated by detecting the amount of movement. The above-explained recording sequence is controlled by the CPU 19 according to a program stored in the ROM 21.

In the embodiment shown in FIG. 1, the recording head 5 is biased toward the recording medium 7 by the plate spring 12 constituting the first biasing means, but it is also possible, as shown in FIG. 5, to use a tension spring 12*a* as the first biasing means to bias the recording head 5 toward the recording medium.

The above-mentioned first and second biasing means may be composed of plate springs, compression springs or other various means or combinations thereof.

As explained above, the present embodiment, being provided with first biasing means for biasing the recording head toward the recording medium and second biasing means for biasing a main body supporting said recording head, is capable of securely and stably pressing the main body and the recording head toward the recording medium in the manual use, thereby recording uniform and clear patterns on the recording medium.

In the following there will be given an explanation of another embodiment, making reference to FIGS. 6 to 9.

The following embodiment provides a recording apparatus for recording information on a recording medium by manual scanning operation, provided with first biasing means for biasing a recording head toward a recording medium and second biasing means for biasing a main body having said recording head toward the recording medium, wherein the biasing force of said second biasing means is selected larger than that of said first biasing means.

Figure 6:
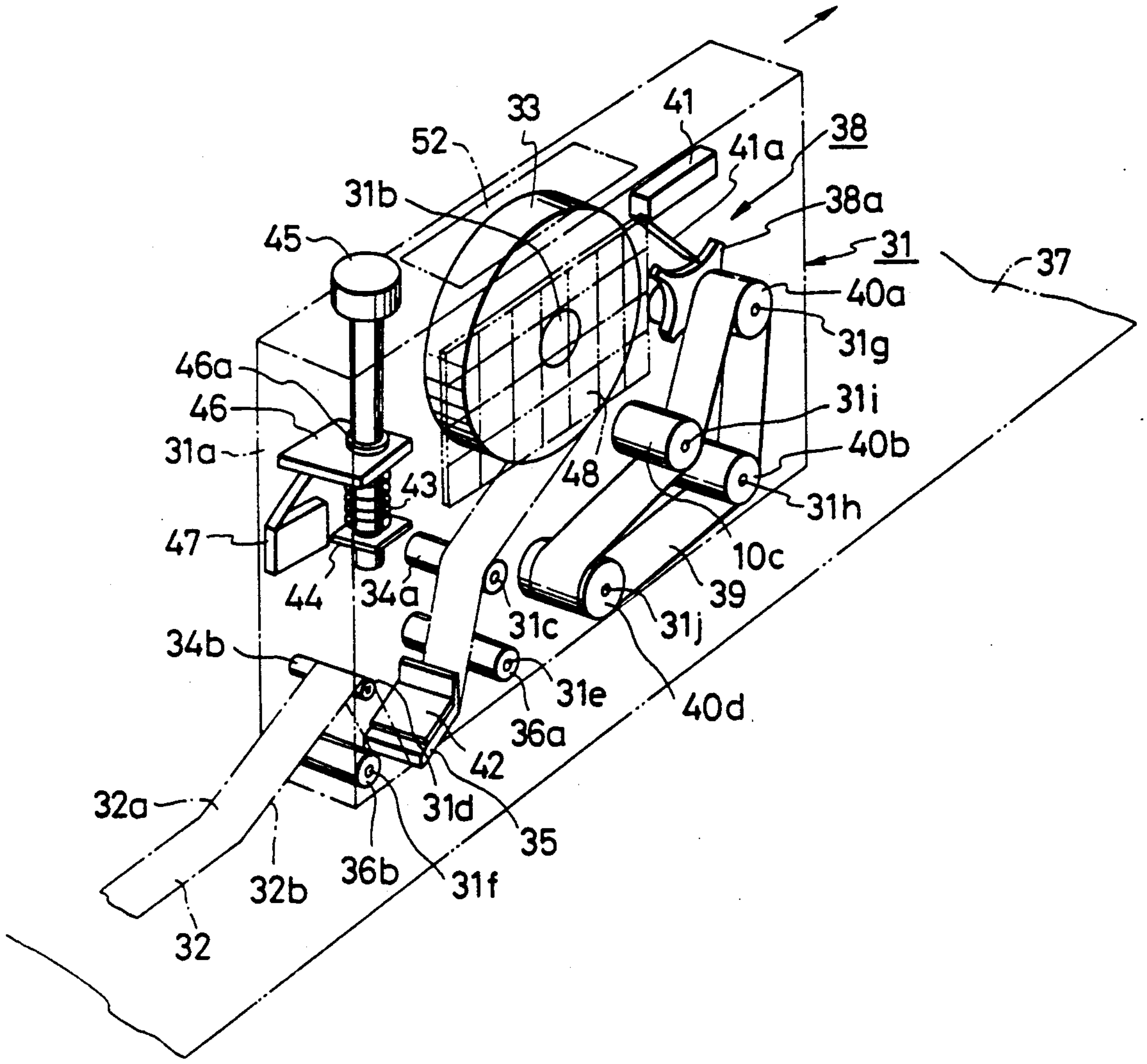
FIG. 6 is a magnified perspective view of a principal part of still another embodiment.
Figure 7:
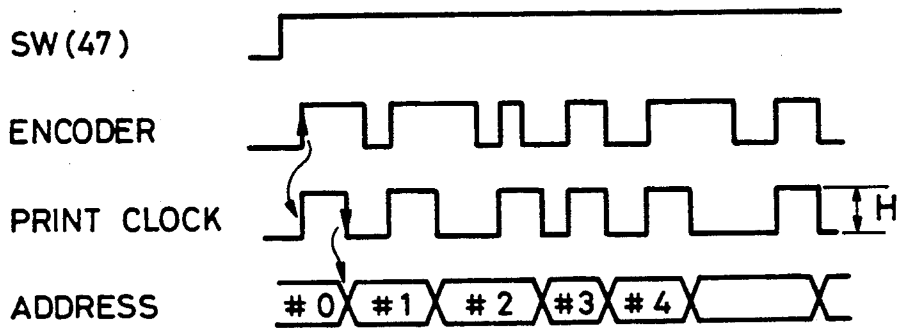
FIG. 7 is a timing chart showing the driving of a recording head.
Figure 8:
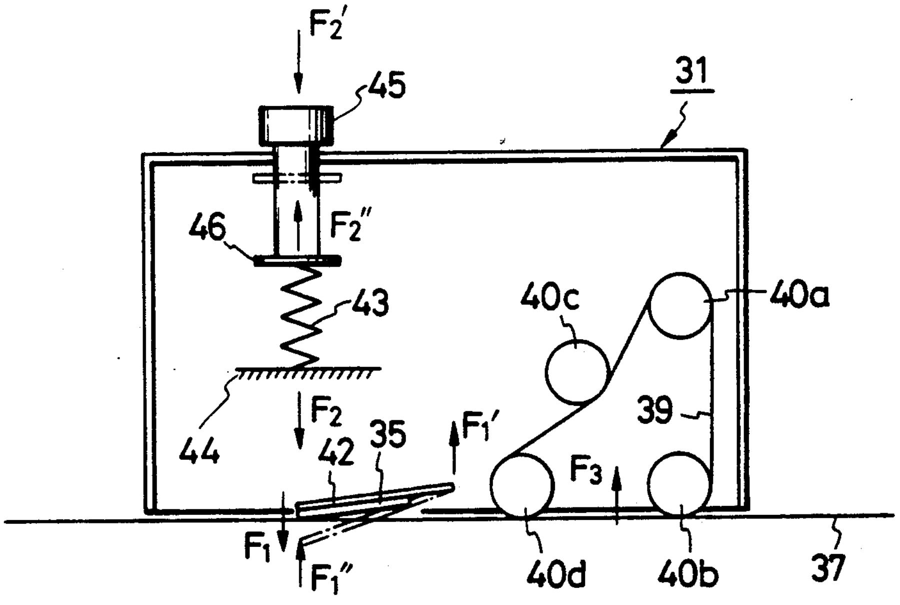
FIG. 8 is a schematic view for explaining the biasing force in said embodiment.
Figure 9:
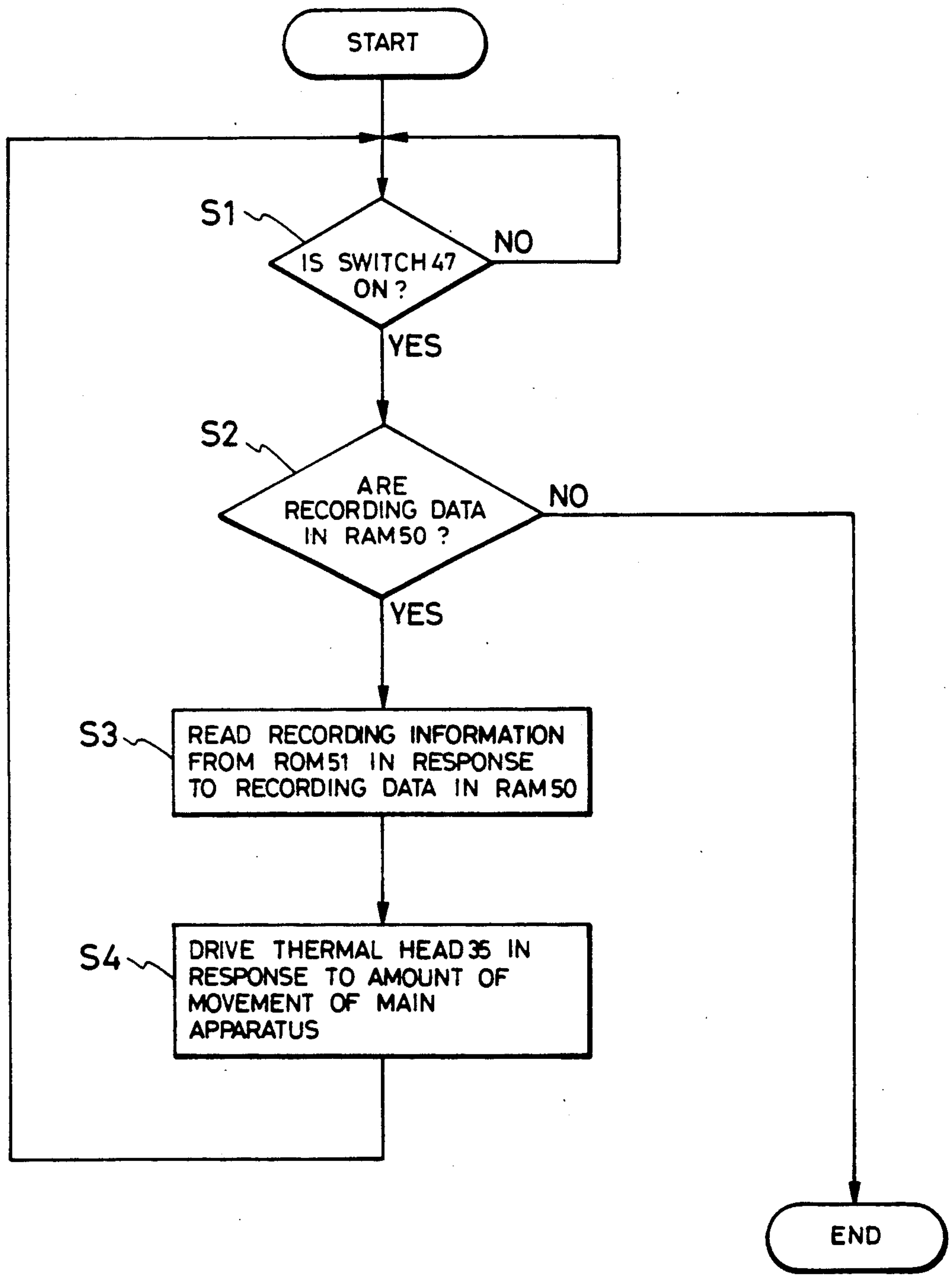
FIG. 9 is a flow chart of the control sequence thereof.

FIG. 6 is a magnified perspective view of a principal portion of the apparatus of the present embodiment; FIG. 7 is a timing chart showing the driving method of the recording head; FIG. 8 is a schematic view showing the biasing forces in the present embodiment; and FIG. 9 is a flow chart of the control sequence.

As the present embodiment is similar in structure to the foregoing embodiment, FIGS. 1B, 2, 3 and 5 are also referred to in the following explanation, and the parts already shown in these drawings will not be explained further.

In FIG. 6 there are shown a main body 31 and a frame 31a thereof.

An ink ribbon 32 is composed of an ink sheet consisting of a substrate 32a coated with heat fusible ink, and, when it is imagewise heated by the recording head 35 to be explained later, the ink 32b on said substrate is fused or becomes less viscous and is transferred onto the recording medium 37 to form a recorded image.

A ribbon reel 33, on which the ink ribbon 32 is wound, is rotatably supported on a shaft 31b provided on the frame 31a.

Guide rollers 34a, 34b, rotatably supported by shafts 31c, 31d provided on the frame 31a, guide the ink ribbon 32 supplied from the ribbon reel 33. The ink ribbon 32 is supplied from the ribbon reel 33, then reaches the recording head 35 through the guide roller 34a, and is extracted to the outside through the guide roller 34b.

Recording head 35 is provided with plural heat-generating resistors 56-1–56-16 selectively energized by a CPU 49, and a driver 55 therefor. Said recording head 35 is mounted, through a plate spring 42, to a bracket, such as bracket 23 in FIG. 1B, mounted at a predetermined position of the frame 31a, and, being biased by said plate spring 42 when mounted on said bracket, protrudes with the ink ribbon 32 thereon from the main body 31, thus being pressed to the recording medium 37. In this state the ink 32b of the ink ribbon 32 is maintained in contact with the recording medium 37.

Running rollers 36a, 36b, rotatably supported by shafts 31e, 31f provided on the frame 31a, partially protrude downwards from the frame 31a. Said rollers 36a, 36b rotate by the friction with the recording medium 37 when the main body 31 is moved on said recording medium such as a notebook, thereby enabling stable movement of the main body 31.

An encoder 38 is formed integrally with the roller 40a, and is rotatably supported by a shaft 31g provided on the frame 31a. Said encoder 38 is provided with plural projecting parts 38a, which come into contact with an actuator 41a of a microswitch 41 to generate pulse signals. An endless flat belt 39, supported by rollers 40a, 40b, 40c, 40d respectively supported rotatably by shafts 31g, 31h, 31i, 31j formed on the frame 31a, is moved in contact with the recording medium 37 to rotate said rollers, thereby rotating said encoder 38. Thus the rollers 40b and 40d partially protrude downwards from the frame 31a.

A compression spring 43 is provided for biasing the main body 31 to the recording medium 37, and is supported between a spring receiving plate 44 fixed, for example with screws, at a predetermined position of the frame 31a, and a movable plate 46 fixed with a stop ring 46a on a switch rod 45. Depression of the switch rod 45 compresses the spring 43, which in turn biases the main body 31 downwards through the spring receiving plate 44.

A microswitch 47, positioned on the frame 31a close to the movable plate 46, contacts said plate 46 when the switch rod 45 is manually depressed, thereby sending a contact signal to the CPU 49.

FIG. 8 shows the relationship of the plate spring 42 and the compression spring 43 in the above-explained recording apparatus.

When the switch rod 45 is manually depressed to a predetermined position where the switch 47 is actuated, the compression spring 43 is assumed to bias the main body 31 with a biasing force $F_2$, while the plate spring 42 is assumed to bias the recording head 35 toward the recording medium 37 with a biasing force $F_1$. The manual depressing force on the switch rod 45 is represented by $F_2'$, while the force of the compression spring 43 for pushing up the switch rod 45 is represented by $F_2''$. The force of the plate spring 42 pushing up the main body 31 is represented by $F_1'$, and the reaction from the recording medium 37 to the recording head 35 is represented by $F_1''$. Since these forces are mutually balanced, there stand following relationships:

$$F_1=F_1'=F_1'' \text{ and } F_2=F_2'=F_2''$$

In the present embodiment, the biasing forces are so selected as to satisfy a relationship $F_1<F_2$ in the above-explained state. More specifically, in the present embodiment, the forces of the compression spring 43 and the plate spring 42 are so selected that the former is larger than the latter.

In addition, when the biasing forces of the plate spring 42 and the compression spring 43 are applied, a reaction $F_3$ is applied from the recording medium 37, to the rollers 40b, 40d etc. through the flat belt 39 of the main body 31, and said reaction $F_3$ satisfies a relation $F_3=F_2-F_1$. Said reaction $F_3$ causes the flat belt 39 to securely engage with the recording medium 37 and to rotate the roller 40a thereby activating the encoder 38 securely.

The control block diagram of the present embodiment is similar to that shown in FIG. 2 and will not, therefore, be explained in detail.

Now reference is made to a flow chart shown in FIG. 9 for explaining the procedure of recording after the information to be recorded is entered.

At first a step S1 discriminates whether the switch 47 is turned on. The recording head 35 can be energized only when the switch 47 is turned on. Thus the switch rod 45 is depressed to turn on the switch 47 while the ink ribbon 32 is pressed to the recoridng medium 37.

A step S2 confirms whether the information to be recorded is present in the RAM 50, and, if absent, the sequence is terminated, but, if present, the sequence proceeds to a step S3 for recording the image.

A step S3 reads the image to be recorded from the ROM 21, according to the recording data temporarily stored in the RAM 50, and a succeeding step S4 effects recording by energizing the recording head 35 according to the image data and the amount of movement of the main body 31. According to the amount of movement of the main body 31, the encoder 38 generates movement detection pulse signals for activating a clock generator 54, which generates a print clock signal of a duration of 2 ms triggered by each of said detection pulse signals. Said print clock signal is used for reading the recording information already stored in the RAM 50. The CPU 49 causes the ROM 51 to generate image data corresponding to said information, and activates the driver 55 in the recording head 35, thereby energizing the heat-generating resistors 56-1–56-16 corresponding to said image data and achieving thermal-transfer recording of the information stored in the RAM 50 onto the recording medium 37.

The steps S1 to S4 are repeated until all the recording data stored in the RAM 50 are exhausted, and the sequence is terminated upon completion of all the recording operation.

FIG. 7 is a timing chart indicating the driving of the recording head 35 in case of recording a character "F", as shown in FIG. 3.

In the present embodiment, the ENCODER pulse is generated by the encoder 38 for each manual movement of the main body 31.

In general, from the standpoint of human engineering, 50 mm/sec is considered as a most appropriate speed at which human being can move an object with a controlled constant speed. Consequently the frequency of the output of the encoder is selected equal to 200 Hz (5 ms per interval). However, in the present embodiment, in order to copy with the inevitable fluctuation in speed, the sixteen heat-generating resistors are activated in parallel manner according to the information to be recorded, for a predetermined period (2 ms) from the leading edge of the output signal of the encoder.

The PRINT CLOCK signal is a clock pulse signal of a duration of 2 ms generated by the clock generator 54 triggered by the leading edge of said ENCODER pulse. The ADDRESS indicates the successive selections of the addresses of the ROM 51, at the leading edges of said print clock signals. The CPU 49 counts the print clock signals and addresses the ROM 51 to read image data according to the information stored therein. The recording data read from the ROM 51 are used for activating the heat-generating resistors during the high-level state (2 ms) of the print clock signal, thereby transferring ink from the ink ribbon 2 onto the recording medium 7. The unevenness caused by manual movement can be eliminated by generating, as explained above, the print clock signal at the leading edge of each clock signal generated by detecting the amount of movement. The above-explained recording sequence is controlled by the CPU 49 according to a program stored in the ROM 51.

In the present embodiment it is assumed that the encoder generates a clock pulse for a movement of ¼ mm, but the present invention is naturally not limited to such embodiment. Also the position of the recording head is not limited to that of the present embodiment as long as the scope of the present invention is satisfied. Furthermore the number of the heat-generating resistors is not limited to sixteen.

In the embodiment shown in FIG. 6, the recording head 35 is biased toward the recording medium 37 by the plate spring 42 constituting the first biasing means, but it is also possible, as shown in FIG. 5, to use a tension spring 42*a* as the first biasing means to bias the recording head 35 toward the recording medium.

The above-mentioned first and second biasing means may be composed of plate springs, compression springs or other various means or combinations thereof.

As explained above, the present embodiment, being provided with first biasing means for biasing the recording head toward the recording medium and second biasing means for biasing a main body supporting said recording head, wherein the biasing force of said second biasing means is selected larger than that of said first biasing means, is capable of securely and stably pressing the main body and the recording head to the recording medium in the manual use, thereby recording uniform and clear patterns on the recording medium.

In the following there will be given an explanation on still another embodiment, while making reference to FIGS. 10A to 14.

The following embodiment is characterized, in addition to the foregoing embodiment, by having detection means for generating detection pulses by detecting marks formed at a predetermined interval, and a recording head generating heat in synchronization with said detection pulses.

In addition to the advantages of the foregoing embodiment, the present embodiment is capable of obtaining a clear image not affected by the fluctuation in the scanning speed, generating detection pulses by detecting marks of a predetermined interval by said detection means and activating the recording head in synchronization with said detection pulses.

Figure 10A:
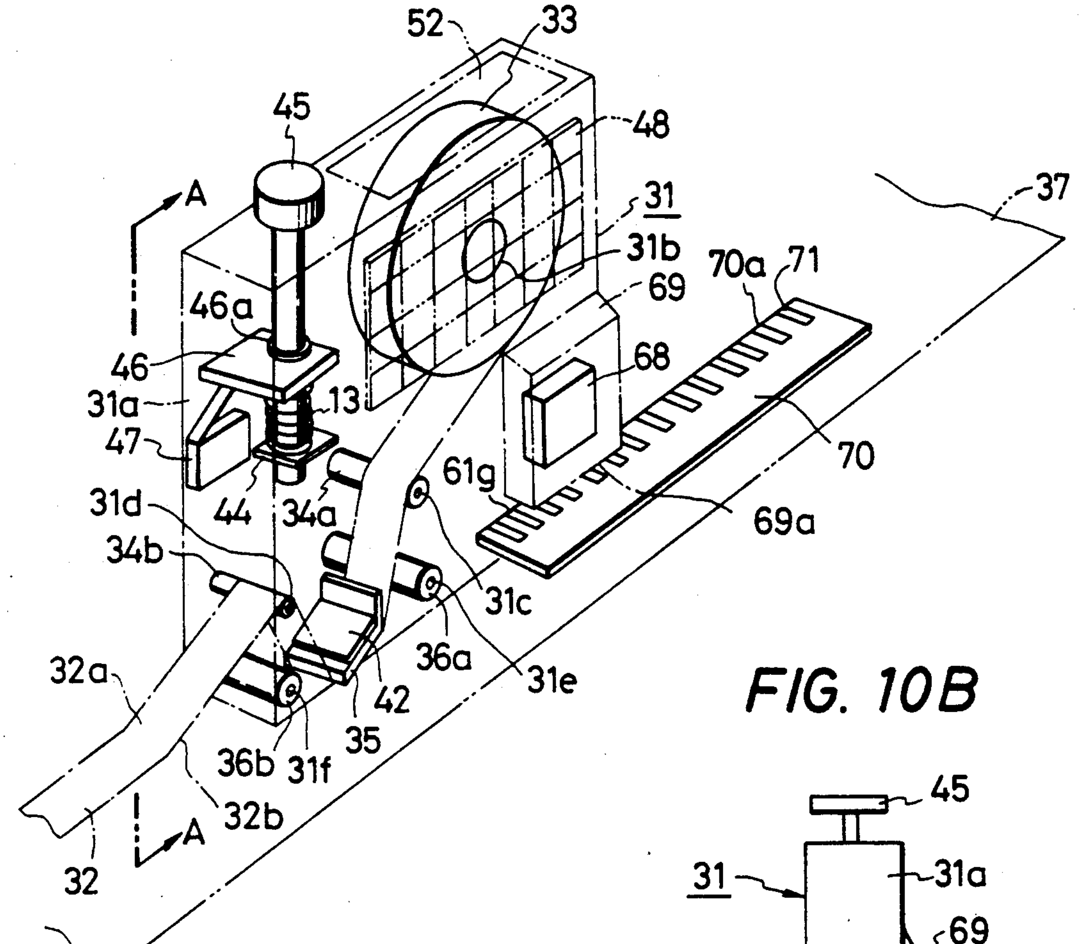
FIG. 10A is a magnified perspective view of still another embodiment.
Figure 10B:
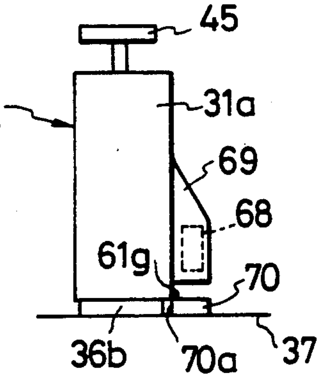
FIG. 10B is a lateral view seen from a direction A.
Figure 11:
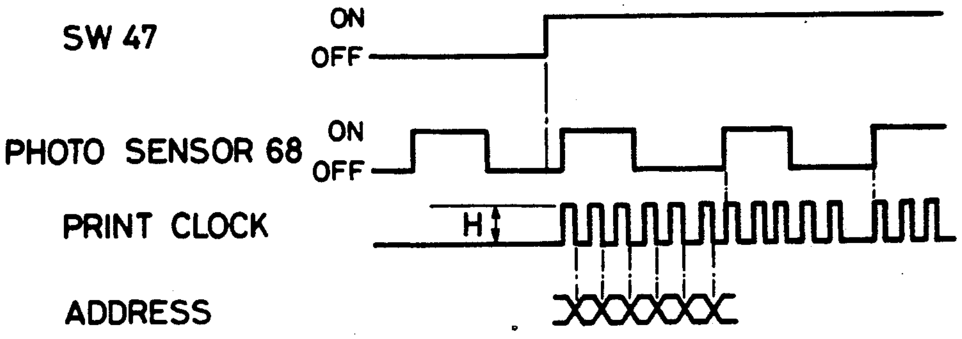
FIG. 11 is a timing chart showing the driving of a recording head.
Figure 12:
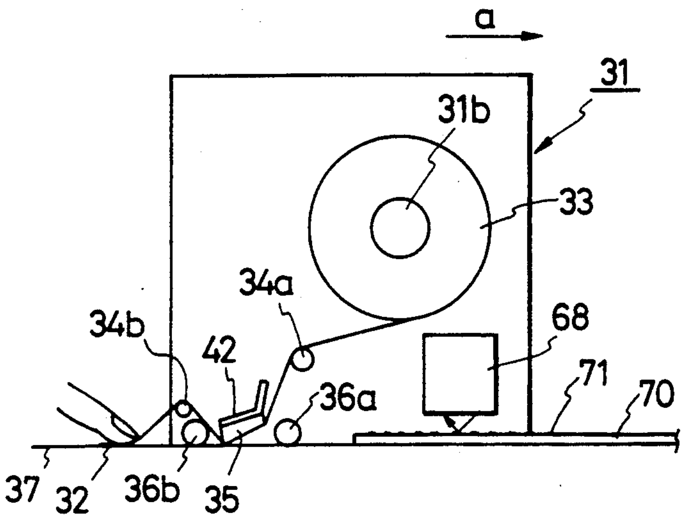
FIG. 12 is a schematic view showing the state of image recording.

FIG. 10A is a partial perspective view of the apparatus of the present embodiment; FIG. 10B is a view seen from the direction of an arrow shown in FIG. 10A; FIG. 11 is a timing chart showing the driving method of the recording head; and FIG. 12 is a lateral schematic view of the apparatus at the recording operation.

Same components as those in the foregoing embodiment are represented by same numbers and will not be explained further.

A photosensor 68 is housed in a case 69 provided on the frame 31*a*, and generates detection pulses by detecting marks 71 on a scale plate 70.

The scale plate 70 is composed of a cardboard or a plastic plate of predetermined width and length, on which plural light-reflecting marks are formed, for example by printing, at a predetermined interval. The interval of said marks 71 is selected equal to the pitch of the characters to be recorded on the recording medium 37. The detection pulse generated upon detection of a mark 71 by the photosensor 68 is used as a trigger for activating the recording head 35, thereby recording a character. A lateral face 70*a* of the scale plate 70 is so constructed as to function as a guide face in contact with a guide 61*g* formed on the main body 31.

FIG. 10B shows the details of the relationship between the above-mentioned photosensor 68 and the scale plate 70. The photosensor 68 is housed downwards in a case 69, which is open in the bottom, provided in the lower part of the external wall of the frame 31*a*. Said photosensor 68 is a reflective sensor having a light-emitting portion and a light-receiving portion, whereby the light emitted from the former is reflected by the mark 71 of the scale plate 70 and received by the latter to generate the detection pulse. The lower end of the frame 31*a* at the case 69 is formed as a guide 61*g* for guiding the main body 31 in contact with the lateral face 70*a* of the scale plate 70. Thus the photosensor 68 is so positioned as to face the marks 71 when said guide 61*g* is maintained in contact with the lateral face 70*a* of the scale plate 70.

Now reference is made to FIG. 12 for explaining the recording procedure after the information to be recorded is entered.

Prior to the start of recording, the main body 31 is placed at the recording position on the recording medium 37, and the ink ribbon is extracted from the main body 31 through the predetermined path and fixed for example with a finger. Then the scale plate 70 is fixed while the lateral face 70*a* thereof is maintained in contact with the guide 61*g* of the main body 31. In this operation, the marks 71 of the scale plate 70 are positioned opposite to the photosensor 68. Consequently, by moving the main body 31 in a direction indicated by an arrow, the photosensor 68 detects the marks 71 in succession to generate detection pulses. The recording operation is conducted according to the steps shown in FIG. 9.

In FIG. 11 PHOTOSENSOR indicates the detection pulses generated by the photosensor 68 in response to the detection of the marks 71 of the scale plate 70 when the main body 31 is moved. The PRINT CLOCK indicates the print clock pulses of a duration of 2 ms generated by the clock generator 54 (FIG. 2), as triggered by downshift edges of said detection pulses. The ADDRESS indicates the state of successive selection of addresses of the ROM 51 (FIG. 2) at the upshift edges of said print clock signals.

The CPU 49 (FIG. 2) counts the print clock signals and reads the image data by addressing the ROM 51, according to the already stored recording information. The data read from the ROM 51 are used for activating the heat-generating resistors during the high-state of the print clock signal, thereby transferring the ink of the ink ribbon 32 onto the recording medium 37.

As explained in the foregoing, a detection pulse is generated by the photosensor 68 upon detecting one of the marks 71 formed with an interval equal to the pitch of characters, and a character is recorded by a print clock signal generated at the leading edge of said detection pulse. Consequently the first dot of the recorded character always coincides with the mark 71, and the positional error caused by manual scanning can be resolved. The above-explained recording operation can be controlled by the CPU 49 (FIG. 2) according to a program stored in the ROM 51.

In the following there will be explained a modification to the foregoing embodiment shown in FIG. 10.

Figure 13:
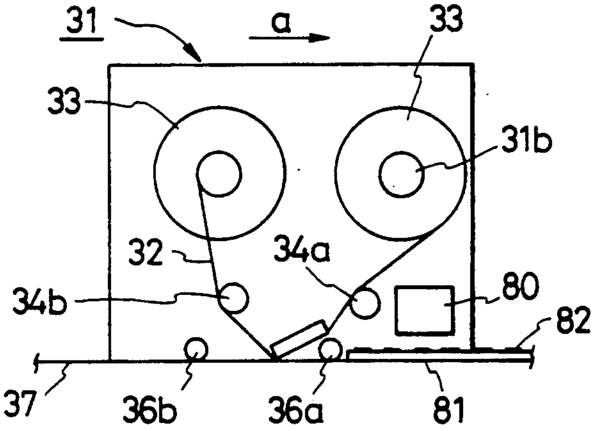
FIG. 13 is a schematic view of still another embodiment.

FIG. 13 shows an embodiment in which a magnetic sensor is employed to detect magnetic marks.

In FIG. 13, a magnetic sensor 80 (for example SONY magnetswitch 200 series) generates a signal when it is brought close to a magnetic material.

A scale plate 81 is provided with marks 82 of small pieces of a magnetic material, for example rectangular pieces of a thin iron plate, printed or adhered on said plate.

The mutual relationship between the magnetic sensor 80 and the scale plate 81 is same as that in the foregoing embodiment (FIGS. 10A, 10B), but both members are separated by a gap of for example ca. 1 mm, in consideration of the characteristics of the magnetic sensor 80.

In the present embodiment, the used ink ribbon 32 is wound by winding means 33.

The recording operation in the present embodiment is conducted in the same manner as in the foregoing embodiment shown in FIGS. 10A and 10B.

In the following there will be explained another modification of the foregoing embodiment shown in FIGS. 10A and 10B.

Figure 14:
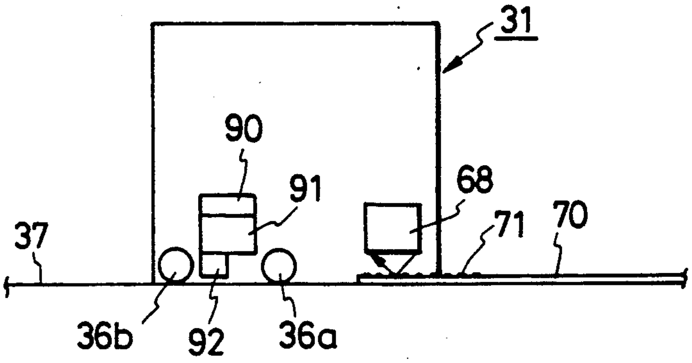
FIG. 14 is a schematic view of still another embodiment.

FIG. 14 shows an embodiment applied to an ink jet recording apparatus.

Ink 90 is contained in a container 91. A recording head 92 is provided with nozzles for emitting the ink 90, and is activated according to the recording information to emit the ink from said nozzles thereby recording an image on the recording medium 37.

There are also provided a photosensor 68 similar to that in the foregoing embodiment, and a scale plate 70.

The recording operation in the present embodiment is conducted in the same manner as in the foregoing embodiment shown in FIGS. 10A and 10B.

In the foregoing embodiments the interval of the pulse signals from the photosensor is assumed to be equal to the pitch of characters, but the present invention is not limited to such embodiments. It is also possible to determine the position of each dot by reducing said interval.

The position of the recording head is not limited to that shown in the foregoing embodiments as long as the scope of the present invention is satisfied, and the number of heat-generating resistors is also not limited to sixteen.

In addition to the foregoing embodiments, the present invention can be applied to a thermal recording apparatus utilizing thermal recording paper as the recording medium. In this recording method a recording head having plural heat-generating elements is brought into contact with a thermal recording paper coated with a material capable of generating a color in response to heat, and said heat-generating elements are activated while said recording head is moved, thereby an image is formed by thus generated heat on said thermal recording paper.

Furthermore, the recording apparatus in the foregoing embodiment can be electrically connected with a control unit of a word processor or a personal computer and utilized for recording information stored in such equipment.

As explained in the foregoing, the embodiments shown in FIGS. 10A to 14 generate detection pulses by detecting marks of a predetermined interval by detection means and activate the recording head in synchronization with said detection pulses, thereby enabling stable image recording not affected by the fluctuation in the scanning speed, in addition to the aforementioned advantage of secure and stable pressing of the main body and the recording head to the recording medium. Also the recording operation can be conducted without influence by the slippage that may occur between the main body and the recording medium.

As in detail in the foregoing, the present invention provides a hand-held recording apparatus capable of providing a clear image.

What is claimed is:

1. A hand-held recording apparatus for image recording on a recording medium by manual movement, comprising:

a main body;

a thermal head provided in said main body and having plural heat-generating elements for image recording on the recording medium;

an ink sheet positioned feedable to a recording position by said thermal head and bearing ink which is transferred onto said recording medium in response to the heat generation of said thermal head;

a first elastic member including a compression spring for biasing said thermal head to said recording medium; and a second elastic member for biasing said main body having said thermal head therein to said recording medium;

wherein the elastic force of said second elastic member is selected larger than that of said first elastic member.

2. A hand-held recording apparatus according to claim 1, wherein said thermal head is capable of a rocking motion against the elastic force of said first elastic member.

3. A hand-held recording apparatus according to claim 1, wherein said thermal head is pressed to said recording medium across said ink sheet by means of the elastic force of said first elastic member.

4. A hand-held recording apparatus for image recording on a recording medium by manual movement, comprising:

a main body;

a recording head provided in said main body for image recording on said recording medium;

first biasing means for biasing said recording head toward said recording medium; and second biasing means including a compression spring for biasing said main body supporting said recording head toward said recording medium.

5. A hand-held recording apparatus for image recording on a recording medium by manual movement, comprising:

a main body;

a recording head provided in said main body for image recording on the recording medium;

first biasing means for biasing said recording head toward said recording medium;

second biasing means including a compression spring for biasing said main body supporting said recording head toward said recording medium;

detection means for generating detection pulses by detecting marks provided at a predetermined interval; and control means for activating said recording head in synchronization with said detection pulses.

6. A hand-held recording apparatus according to claim 1 or 5, wherein said recording head is a thermal head having plural heat-generating elements.

7. A hand-held recording apparatus according to claim 4 or 5, wherein said first biasing means is a plate spring.

8. A hand-held recording apparatus according to claim 4 or 5, wherein said second biasing means is a coil spring.

9. A hand-held recording apparatus according to claim 4 or 5, wherein said main body supports an ink ribbon which can be fed in succession to the recording position of said recording head.

10. A hand-held recording apparatus according to claim 4 or 5, wherein the biasing force of said second biasing means is selected larger than that of said first biasing means.

11. A hand-held recording apparatus according to claim 1, further comprising:

a spring receiving plate fixed to the main body;

a movable plate atop the compression spring; and a switch rod fixed to the movable plate, wherein upon application of downward pressure to the switch rod the compression spring is compressed to bias the main body downward.

12. A hand-held recording apparatus according to claim 1, further comprising a control unit comprised of a RAM, a ROM and a CPU, wherein recording information stored in said RAM in accordance with movement of the main body is output and the CPU generates image date corresponding to recording information in ROM.

13. A hand-held recording apparatus according to claim 4, further comprising a control unit comprised of a RAM, a ROM and a CPU, wherein recording information stored in said RAM in accordance with movement of the main body is output and the CPU generates image date corresponding to recording information in ROM.

14. A hand-held recording apparatus according to claim 5, further comprising a control unit comprised of a RAM, a ROM and a CPU, wherein recording information stored in said RAM in accordance with movement of the main body is output and the CPU generates image date corresponding to recording information in ROM.

15. A hand-held recording apparatus according to claim 4, further comprising:

a spring receiving plate fixed to the main body;

a movable plate atop the compression spring; and a switch rod fixed to the movable plate, wherein upon application of downward pressure to the switch rod the compression spring is compressed to bias the main body downward.

16. A hand-held recording apparatus according to claim 5, further comprising:

a spring receiving plate fixed to the main body;

a movable plate atop the compression spring; and a switch rod fixed to the movable plate, wherein upon application of downward pressure to the switch rod the compression spring is compressed to bias the main body downward.

17. A hand-held recording apparatus according to claim 11, wherein downward pressure of said switch rod energizes the printing head.

18. A hand-held recording apparatus according to claim 15, wherein downward pressure on said switch rod energizes the printing head.

* * * * *

UNITED STATES PATENT AND TRADEMARK OFFICE

CERTIFICATE OF CORRECTION

PATENT NO. : 5,093,675

DATED : March 3, 1992

INVENTOR(S) : NOBORU KOUMURA, ET AL.

It is certified that error appears in the above-identified patent and that said Letters Patent is hereby corrected as shown below:

COLUMN 3:

Line 45, "(#4)." should read --(#0-4).--.

COLUMN 10:

Line 37, "As" should read --As explained--;

Line 52, "including a compression spring" should be deleted;

Line 55, "member" should read --member including a compression spring--.

Signed and Sealed this

Tenth Day of August, 1993

Attest:

MICHAEL K. KIRK

Attesting Officer

Acting Commissioner of Patents and Trademarks